Dec. 2, 1958     E. I. REITEN     2,862,349
RAKE TOOTH AND MOUNTING
Filed June 10, 1955
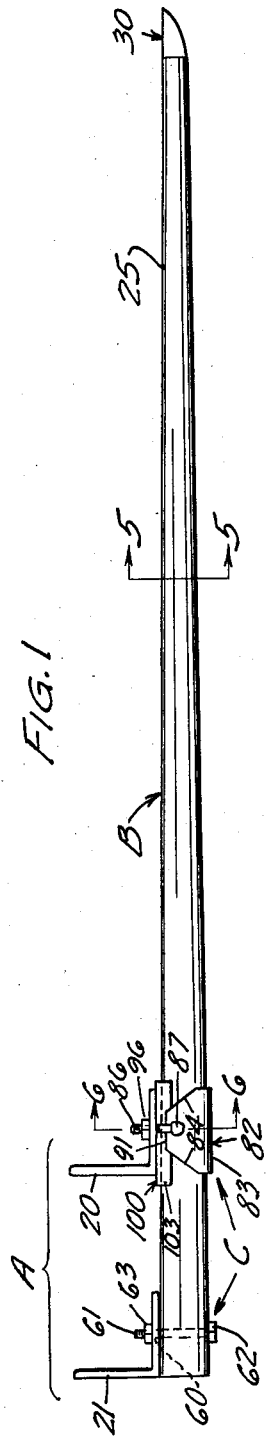
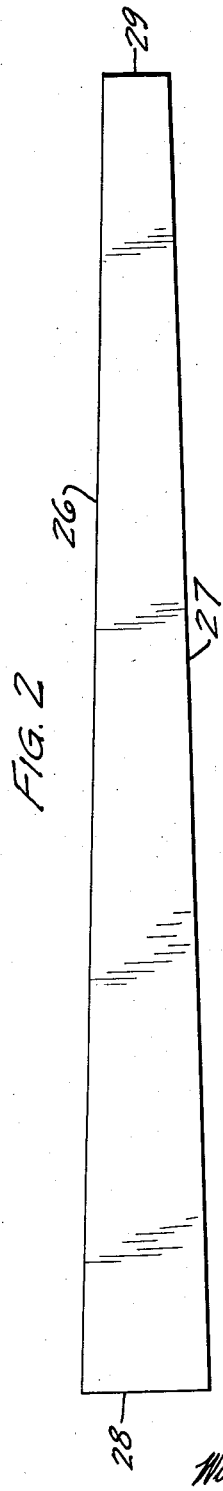
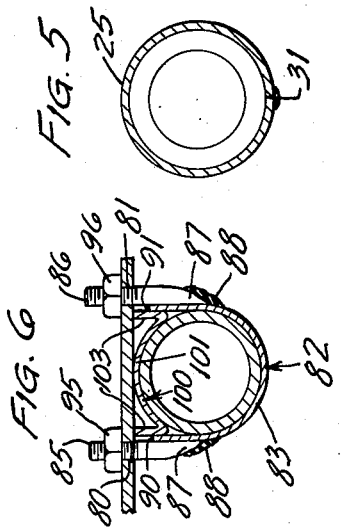
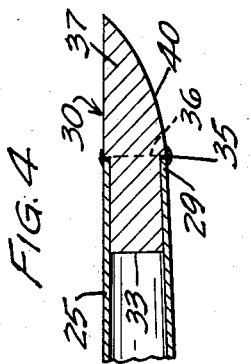
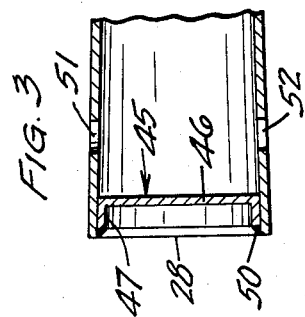
INVENTOR
EDWIN I. REITEN
BY Williamson, Schroeder, Adams & Meyers
ATTORNEYS United States Patent Office 2,862,349
Patented Dec. 2, 1958

2,862,349

RAKE TOOTH AND MOUNTING

Edwin I. Reiten, Cooperstown, N. Dak.

Application June 10, 1955, Serial No. 514,660

4 Claims. (Cl. 56—400)

This invention relates to stackers, and more particularly to a metal tooth structure and mount for use with hay and bale-loading equipment and the like.

The prior application shows a special bracket mount which is designed to adapt my rake tooth to a conventional rake frame of equipment which is intended to pick up loose or baled hay and the like from the ground. The present application is concerned primarily with my rake tooth structure and its special mounted cooperation with the bracket.

In prior art brackets, wooden teeth of square or rounded form have been used in spaced parallel relation on the equipment above mentioned. The teeth lie in substantially the same plane and are tapered forwardly and provided with a wearing tip at the end so that contact with the ground will not unduly wear or deteriorate the tooth. The wooden tooth is solid in construction and is intended to have a sufficient amount of springiness so that it can withstand shock such as may occur from striking a rock or gouging mounds of earth. Unfortunately, the strength of the conventional wooden tooth is not great in a lateral direction and the teeth often break and splinter from use. Furthermore, since the teeth are generally exposed to outside weather conditions, the wood becomes dry and cracks in time. Still further, the outermost surface of such wooden teeth tend to sliver and become rough, thereby lessening in efficiency as time progresses since straw, hay and the like should slide smoothly over the surface of the tooth when the rake is being used. The conventional wooden tooth does have several advantages, however, particularly in that the wood structure is light and the formation is solid from the butt to the tip. Mounting holes may, therefore, be drilled without special care laterally through the butt or thick end of the tooth without weakening the solid structure at this point. A pair of bolts, therefore, are all that is necessary in the mounting of the usual conventional wooden tooth, and such bolts are simply passed through corresponding openings formed in frame members at a forward position on the rake structure.

It has long been recognized that metal might be substituted for wood in the manufacture of rake teeth and, as a result, pipe and straight metal tubing have been tried numerous times as substitutes for the wooden teeth. Unfortunately, if the pipe or standard tubing is strong enough at the rear portion where it is mounted to the rake frame, then the tooth is unnecessarily heavy and unyielding toward the forward position. Conversely, if the tubing is rendered flexible and light at the forward portion, then the rearward area is too weak for mounting conventionally to the rake frame. The troubles encountered by such pipe or tubing tooth structures are further compounded by a tendency of such tooth to buckle at a weak point or at a fulcrum point where the tooth is mounted to the rake. Whereas a wooden tooth could be drilled at the solid butt area and solidly bolted to the frame, the pipe-like tooth structures become drastically weakened when employing the conventional mode of mounting.

I have found that it is possible to construct a metal rake tooth comparable in weight to a conventional wooden tooth and superior in strength, resilience, wearing quality and efficiency of operation. Contrary to commonly understood proposals, my improved tooth structure has resulted, not from strengthening the tooth through use of excessive metal material, but rather through special design with attention to uniformly distributing stresses throughout the length of the tooth, and by firmly mounting the butt end of the tooth in such a manner as not to locally weaken the tooth or create any natural buckling point. Having uniformly lightened the tooth, I have found that the flexibility thereof is increased and, hence, the recovery rate of such tooth from collision becomes greatly improved.

It is, therefore, a general object of this invention to provide an all-metal rake tooth and mount therefor which can be easily and quickly adapted to a rake frame and which will then operate efficiently as a distinct improvement over the well known conventional wooden rake tooth.

More specifically, it is an object of the invention to provide a tooth and mount therefor which is light in weight and economical to produce, yet is so constructed as to eliminate points of natural weakness and to produce uniform over-all strength.

It is a further object of the invention to provide a sweep rake tooth which will be resilient and have a high order of flexibility without easily breaking or buckling.

It is still a further object of the invention to provide an all-metal rake tooth which will pick cleaner in raking or sweeping hay, straw and the like with less power requirement because of its lesser frictional resistance and further will not warp, split or sliver because of outdoor weather conditions.

A still further obpect is to provide an all-metal rake tooth of the class described which will have resilience for substantially its entire length, including a portion of its length which is held in mounted condition.

These and other objects and advantages of my invention will more fully appear from the following description made in connection with the accompanying drawings wherein the same reference characters apply to the same parts throughout the several views and in which:

Fig. 1 is a side elevation of my improved steel tooth structure adapted for use with a hay stacker or sweep rake and in mounted position relative to the frame thereof, the frame portions being shown in vertical section at the point of mounting with other portions unnecessary to an understanding of this invention being eliminated from the view;

Fig. 2 is a plan view of a metal sheet blank which has been cut preparatory to shaping my tapered tooth structure therefrom;

Fig. 3 is an enlarged vertical sectional view taken through the axis of a segment at the butt end of the tooth as shown in Fig. 1, with the mounting structure removed;

Fig. 4 is an enlarged longitudinal cross sectional view taken through the outer tip end of the tooth structure;

Fig. 5 is an enlarged transverse cross sectional view taken through the rake tooth on line 5—5 of Fig. 1; and Fig. 6 is an enlarged transverse cross sectional view taken substantially at the line 6—6 of Fig. 1 through the forward supporting bracket of the bracket assemblage C.

With continued reference to the drawing, the letter A in Fig. 1 signifies my improved bracket assemblage for mounting the tooth upon the frame of a stacker, sweep rake or the like of conventional form. Such conventional equipment usually includes a boom arm and a rake head or frame having tooth-supporting bars 20 and 21. The latter are adapted to support a plurality of teeth, each of which is substantially identical to the improved tooth structure indicated generally at B. The tooth B is adapted to be supported by the supporting bars 20 and 21 through use of my improved bracket assemblages indicated generally at C.

The steel rake tooth B includes a tubular metal body portion 25 which may be constructed of high grade steel, rolled or otherwise formed, and having a high degree of resilience and tensile strength. The tooth 25 may also be constructed from other metal alloy such as composed largely of magnesium or aluminum to provide additional lightness while preserving the strength of the tooth. The tooth structure is preferably stamped from rolled stock in the form shown in Fig. 2, with the longitudinal edges 26 and 27 converging uniformly from the end 28, which defines the large or butt end of the tooth, up to the end 29, which defines the smaller or tip end of the tooth 25. The converging angulation forms a taper such that when the sheet stock is rolled and shaped to form, a graduated taper of approximately one-eighth to three-sixteenths inches per foot is created. As an example, when a tooth ten feet long is constructed, the larger or butt end of the body, when formed, will have a diameter of approximately three inches, and the smaller end to which the wearing tip 30 is to be connected, has a diameter of approximately one and three-eighths inches. The edges 26 and 27 are in proximity when the body is so rolled and are welded lengthwise of the body to make a seam 31 as appears in Fig. 5 of the drawing. The welding bead formed at seam 31 may be matchined but since it is intended to lie at the bottom edge of the rake tooth, it may be left in its natural state for additional strength.

The working or wearing tip 30 is formed of wear-resistant material such as solid forged steel, or it may be cast of higher grade steel. It is understood, of course, that other materials or alloys may be used in the construction of tip 30; it being borne in mind that the tip should withstand considerable abrasion and shock during use. The tip 30 is illustrated in cross section in Fig. 4 and is provided with a reduced shank 33 which is adapted to interfit tightly with the tip end of tooth 25, as there shown. A weld 35 is made at the shouldered junction 36 of the shank 33 with the remaining exposed portion of tip 30 in connection with the forward end edge 29 of the tooth body 25. A gap or clearance may be left between the edge 29 and tip 30 so that the weld 35 will fill therein and be capable of grinding down to a smooth juncture, as is commonly practiced in the art of welding. It will be noted that the forward end 37 of tip 30 may be raised, as shown in Fig. 4 so as to lessen the likelihood of the tip gouging or impaling hard earth or objects imbedded in the surface of the earth. The under surface 40 provided by the raising of the tip head will produce a longitudinally convexed and tapered riding surface which will readily slip under a bale or through hay, stray and the like without snagging or catching, both during forward movement of the tooth and during retraction thereof.

At the larger end of the tooth B, a sealing cap 45 is provided, and such sealing cap is preferably formed of the same metal as the body portion 25 of the tooth. The sealing cap is flanged so as to provide a circular disc portion 46 and a rearwardly extending annular flange 47. The sealing cap is inserted into the larger end of the tooth and is annularly welded to rear edge 28 at the juncture 50, as shown in Fig. 3. Aligned holes or openings 51 and 52 are drilled through the large end of tooth B in proximity with sealing cap 45 so that considerable pressure may be exerted thereon without distorting or breaking the tube. It will be observed that the cap 45 will be placed under compression when a bolt is drawn tightly through the openings 51 and 52, as will be subsequently described.

For reasons of economy, the sheet blank shown in Fig. 2 is preferably formed from stock of uniform thickness. However, since the finished tooth body 25 has a taper from one end to the other, uniform resilience may be achieved throughout the entire length of the tooth. Obviously, the larger or butt end of the tooth will be less resilient and the forward or tip end of the tooth will be more resilient. Uniform taper, however, does not permit any one position from having local weakness which would tend to buckle the tooth at such position. Furthermore, the special mounting provided for the tooth is such as to firmly hold each tooth and yet permit the flexing of the tooth throughout its total length.

In conventional stackers or sweep rakes, the bars 20 and 21 are each provided with a single bolting hole and bolt for the mounting of one rake tooth. Thus, as shown for the bar 21, a bolt hole 60 is provided in the lower flange of the angle bar 21 and the larger end of the rake tooth is adapted to be mounted through the holes 51 and 52 with the shank of a bolt 61 with its head 62 resting under the tooth B and the upper threaded end thereof projecting through the bolt hole 60 to receive a nut 63 for the securement and tightening of the rear end of the tooth B to the angle bar 21. As previously pointed out, tightening the nut 63 will not weaken or buckle the large end of the tooth B since sealing plate 45 has a high compressive strength and the tooth shape is rigidly maintained in the area adjacent thereto.

In conventional practice, the angle bar 20, which is the forward or outer frame bar in the frame support structure A, is similarly provided with a single bolt for conventionally bolting a wooden rake tooth thereto. However, since drilling the metal tube forwardly of the rear mount would weaken the tooth at this point, and whereas the insertion of a rigidifying element such as sealing plate 45 at a point forwardly of the rear mount would destroy the uniform flexibility of tooth B from its rear mount to the tip thereof, I have found that other means are desirable to complete the mounting structure without so rigidifying or weakening the tooth. I, therefore, provide additional openings 80 and 81 through the flange portion of frame bar 20 as shown in Fig. 6, for receiving the threaded ends of a U-bolt bracket body or saddle assembly designated generally at 82 in Fig. 6. Bracket body 82 is formed preferably of durable steel or other metal and includes a saddle portion 83, in the form of a cylindrical segment, the upper ends of which extend vertically and thus define a generally U-shaped saddle member. The saddle is relatively wide and the rake tooth B seats snugly in the bight portion thereof. At its upper ends, the saddle 83 may be slightly tapered at the corner edges, as shown at 84. Threaded bolt shanks 85 and 86 are broadened and somewhat flattened at their lower ends 87 and welded at 88 upon the outer surfaces of the upper ends of the saddle 83. The screw-threaded portions of the shanks 85 and 86 extend beyond the end edges 90 and 91 of the saddle 83. They are spaced approximately the same distance as the openings 80 and 81 and are adapted to extend somewhat loosely through said openings for receiving nuts 96 and 95 by means of which the saddle may be secured in a U-shaped position beneath the bar 20 for supporting the rake tooth B.

An important part of the bracket assemblage C is the provision of a form-fitting filler or seating plate 100, as shown in Figs. 1 and 6. This form-fitting filler plate includes an arcuate tube-seating body portion 101. It also has two upstanding flanges 103 which lie in a position somewhat tangential to the arc from which the seat 101 is struck. This form-fitting filler plate lies immediately beneath the horizontal flange of the bar 20 and above the body portion of the tooth B. The filler plate 100 is preferably longer than the width of saddle 83 and likewise longer than the lower horizontal flange of the bar 20. The body portion 101 of the filler plate is formed to fit snugly the curvature of the tooth at its upper side so as to normally lie in uniform pressing engagement over the entire contacting area of the body portion with the upper side of the tooth B and in opposed relation to the wide saddle 82, as shown in Figs. 1 and 6.

An important feature of the invention is the production of a special cooperating mount member which does not require either weakening bolt holes or rigidifying reinforcement of the tooth body 25 in order to secure effective engagement and attachment of the tooth with respect to the frame bar 20. On the other hand, the resilience of the tooth is maintained all the way from the rigid mount upon frame 21 through the saddle bracket secured to frame 20 and outwardly to the forward end of the tooth. The saddle 82 may rock slightly in a forward and rearward direction so as not to provide a completely rigid fulcrum which would tend greatly to encourage buckling of the tooth B. On the other hand, resilient stress may be uniformly transmitted through the saddle member and rearwardly to the mount on frame bar 21 in such a manner as to increase the overall resilience of the tooth to permit better recovery without breakage when the tooth strikes or collides with a rigid object. The filler plate 100, of course, cooperates with the saddle member to maintain the entire periphery of the tooth in the area of the bracket 82 in round condition to prevent even the beginning of creasing or buckling which, if once started, soon results in destruction of the tooth.

In mounting the tooth, one of the bolt shanks of the bracket is placed in one of the openings of bar flange 20 and the respective nut is started thereon. The other shank is then inserted into the bar opening so as to bring the saddle 83 snugly around the tooth B. The other nut is then drawn up loosely thereon and the form-fitting filler plate is inserted between tooth B and the horizontal flange of bar 20 before drawing up nuts 95 and 96 to final fastening condition. The tooth is positioned before the completion of the mount so that its pointed tip 30 lies in the position shown in Fig. 4. Longitudinal position is then adjusted so that holes 51 and 52 are aligned with openings 60 and bolt 61 inserted therethrough. Nut 63 is then tightened and nuts 95 and 96 similarly tightened to complete the assemblage.

It will be noted that the rear bolt 61 furnishes a rigid mount to frame bar 21 and provides thrust against longitudinal force on the tooth. The bracket 82, on the other hand, maintains the lateral position of the tooth, yet permits resilience to be transmitted along the tooth all the way back to the rear mount as previously pointed out.

It will, of course, be understood that various changes may be made in the form, detail, arrangement and proportion of the parts without departing from the scope of my invention.

What I claim is:

1. A sweep rake comprising first and second substantially parallel supporting bars, a plurality of teeth operatively associated with said bars, each tooth being of tubular form with a butt end and a tip end, said tip end having a penetrating tip portion, said butt end having a reinforcing and sealing insert, said butt end being bolt connected to said first supporting bar and said tooth inwardly of said butt end being connected to said second supporting bar by means of a wide saddle, whereby said teeth are rigidly connected to said bars and are free to flex.

2. Apparatus as defined in claim 1 wherein each of said teeth is constructed of thin sheet metal and tapers uniformly inwardly from the butt end thereof to the tip end thereof whereby said teeth are relatively light and are substantially uniformly resilient when subjected to shock loads.

3. Apparatus as defined in claim 1 wherein said reinforcing and sealing insert comprises a substantially circular disc portion including an annular flange the outer surface of which is in contact with the inner surface of the associated tooth, a portion of said insert being fixedly secured to said tooth.

4. Apparatus as defined in claim 1 wherein said saddle has a shank secured to opposite side portions thereof for attaching the saddle to said second supporting bar, a filler plate having upstanding flanges formed integrally at opposite end portions thereof disposed adjacent the shanks of said saddle, the upper ends of said flanges being in bearing engagement with the underside of said second supporting bar, said filler plate including an arcuate tooth seating body portion intermediate the flange portions adapted to oppose the saddle, said filler plate being adapted to maintain said saddle portion in clearance with said second bar portion, whereby said filler plate will firmly and uniformly clamp an associated tooth, yet permit slight rocking about said shanks to prevent buckling of the tooth when flexed.

References Cited in the file of this patent

UNITED STATES PATENTS

| 650,676 | Frank | May 29, 1900 |
| 677,765 | Hoerr | July 2, 1901 |
| 911,017 | Kouns | Jan. 26, 1909 |
| 1,253,402 | Lovejoy | Jan. 15, 1918 |
| 1,269,393 | Cope | June 11, 1918 |
| 1,475,744 | Brown | Nov. 27, 1923 |
| 1,480,108 | Pearson | Jan. 8, 1924 |
| 1,652,260 | Thompson | Dec. 13, 1927 |
| 2,679,721 | Johnson | June 1, 1954 |

FOREIGN PATENTS

| 12,126 | Great Britain | Sept. 13, 1887 |
| 523,064 | Belgium | Oct. 15, 1953 |